United States Patent
Mowatt et al.

(10) Patent No.: US 11,663,175 B2
(45) Date of Patent: *May 30, 2023

(54) DEPLOYMENT OF APPLICATIONS CONFORMING TO APPLICATION DATA SHARING AND DECISION SERVICE PLATFORM SCHEMA

(71) Applicant: Microsoft Technology Licensing, LLC, Redmond, WA (US)

(72) Inventors: David Mowatt, County Dublin (IE); Stephen O'Driscoll, Bray (IE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/554,609

(22) Filed: Aug. 28, 2019

(65) Prior Publication Data

US 2019/0384749 A1 Dec. 19, 2019

Related U.S. Application Data

(63) Continuation of application No. 15/268,930, filed on Sep. 19, 2016, now Pat. No. 10,409,786.

(51) Int. Cl.
*G06F 16/21* (2019.01)
*G06F 16/23* (2019.01)
(Continued)

(52) U.S. Cl.
CPC .............. *G06F 16/212* (2019.01); *G06F 8/60* (2013.01); *G06F 8/71* (2013.01); *G06F 9/54* (2013.01);
(Continued)

(58) Field of Classification Search
CPC .. G06F 16/212; G06F 16/958; G06F 16/2365; G06F 8/60; G06F 8/71
See application file for complete search history.

(56) References Cited

U.S. PATENT DOCUMENTS 5,742,823 A * 4/1998 Edwards ............... G06F 9/5066
717/149
9,645,980 B1 * 5/2017 Kim ..................... G06F 9/44521
(Continued)

FOREIGN PATENT DOCUMENTS

CN 101103332 A 1/2008
CN 101647010 A 2/2010
(Continued)

OTHER PUBLICATIONS

"Office Action Issued in European Patent Application No. 17772550. 4", dated Apr. 15, 2020, 7 Pages.
(Continued)

*Primary Examiner* — Hares Jami

(57) ABSTRACT

Systems, methods, and software are disclosed herein for facilitating deployment of a decision service for sharing application data among multiple isolated applications executing on one or more application platforms. In an implementation, a method of deploying applications conforming to a platform schema for facilitating sharing of the application data among isolated applications executing on one or more application platforms is described. The method includes receiving a request to submit a third party application to an application deployment system, identifying a validation manifest associated with a platform schema responsive to receiving the request, and automatically verifying that the third party application to conforms to the platform schema by performing a set of pre-defined validation checks. The request identifies the platform schema and platform capability information associated with the third (Continued)

party application. The validation manifest includes the set of pre-defined validation checks.

19 Claims, 6 Drawing Sheets

(51) Int. Cl.
| | | |
|---|---|---|
| G06F 9/54 | (2006.01) | |
| G06F 8/60 | (2018.01) | |
| G06F 16/958 | (2019.01) | |
| G06F 8/71 | (2018.01) | |
| H04L 67/00 | (2022.01) | |

(52) U.S. Cl.
CPC ........ *G06F 16/2365* (2019.01); *G06F 16/958* (2019.01); *H04L 67/34* (2013.01)

(56) References Cited

U.S. PATENT DOCUMENTS

| | | | |
|---|---|---|---|
| 2003/0182563 A1* | 9/2003 | Liu | G06F 21/10 713/191 |
| 2005/0060722 A1 | 3/2005 | Rochette et al. | |
| 2005/0154557 A1* | 7/2005 | Ebert | G06F 11/3438 702/182 |
| 2007/0079079 A1 | 4/2007 | Li et al. | |
| 2009/0254601 A1 | 10/2009 | Moeller et al. | |
| 2012/0084319 A1* | 4/2012 | Bansode | G06F 16/252 707/769 |
| 2014/0095692 A1 | 4/2014 | Anderson et al. | |
| 2014/0282608 A1* | 9/2014 | Biancalana | G06F 9/544 719/312 |
| 2015/0012908 A1* | 1/2015 | Farooqi | G06F 8/34 717/107 |
| 2015/0135160 A1 | 5/2015 | Gauvin et al. | |
| 2016/0147518 A1* | 5/2016 | Dimitrakos | G06F 8/60 717/120 |
| 2018/0316768 A1* | 11/2018 | Goldsmith | H04L 67/52 |
| 2019/0266067 A1* | 8/2019 | Bell | G06F 11/3604 |

FOREIGN PATENT DOCUMENTS

| | | |
|---|---|---|
| CN | 102096857 A | 6/2011 |
| CN | 102693261 A | 9/2012 |
| CN | 102855538 A | 1/2013 |
| CN | 103888527 A | 6/2014 |
| CN | 104838630 A | 8/2015 |
| CN | 105187477 A | 12/2015 |
| CN | 105554087 A | 5/2016 |
| CN | 105745599 A | 7/2016 |

OTHER PUBLICATIONS

"Office Action Issued in European Patent Application No. 17780922.5", dated Apr. 24, 2020, 8 Pages.
"Non-Final Office Action Issued in U.S. Appl. No. 15/268,950", dated Nov. 20, 2019, 12 Pages.
"First Office Action and Search Report Issued in Chinese Patent Application No. 201780057504.9", dated Jan. 5, 2021, 15 Pages.
"First Office Action and Search Report Issued in Chinese Patent Application No. 201780057490.0", dated Jan. 15, 2021, 13 Pages.
"Second Office Action Issued in Chinese Patent Application No. 201780057490.0", dated Jun. 21, 2021, 12 Pages.
"Office Action Issued in European Patent Application No. 17772550.4", dated Mar. 29, 2021, 5 Pages.
"Office Action Issued in Chinese Patent Application No. 201780057490.0", dated Sep. 18, 2021, 10 Pages.
"Second Office Action Issued in Chinese Patent Application No. 201780057504.9", dated Aug. 16, 2021, 17 Pages.
"Notice of Allowance Issued in European Patent Application No. 17772550.4", dated Apr. 7, 2022, 7 Pages.
"Third Office Action Issued in Chinese Patent Application No. 201780057504.9", dated Mar. 4, 2022, 5 Pages.
"Notice of Allowance Issued in Chinese Patent Application No. 201780057504.9", dated May 31, 2022, 4 Pages.
"Notice of Allowance Issued in European Patent Application No. 17772550.4", dated Jul. 27, 2022, 7 Pages.
"Notice of Allowance Issued in European Patent Application No. 17772550.4", dated Aug. 25, 2022, 2 Pages.
"First Office Action and Search Report Issued in Chinese Patent Application No. 201780057497.2", dated Nov. 24, 2022, 9 Pages.

\* cited by examiner

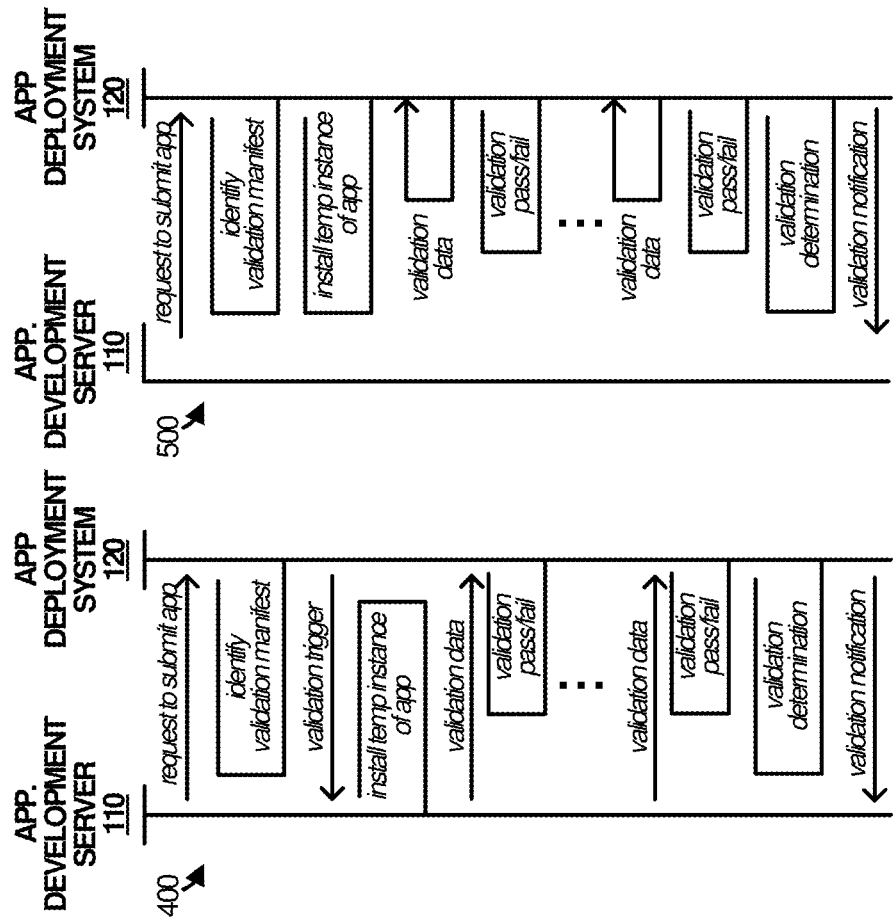

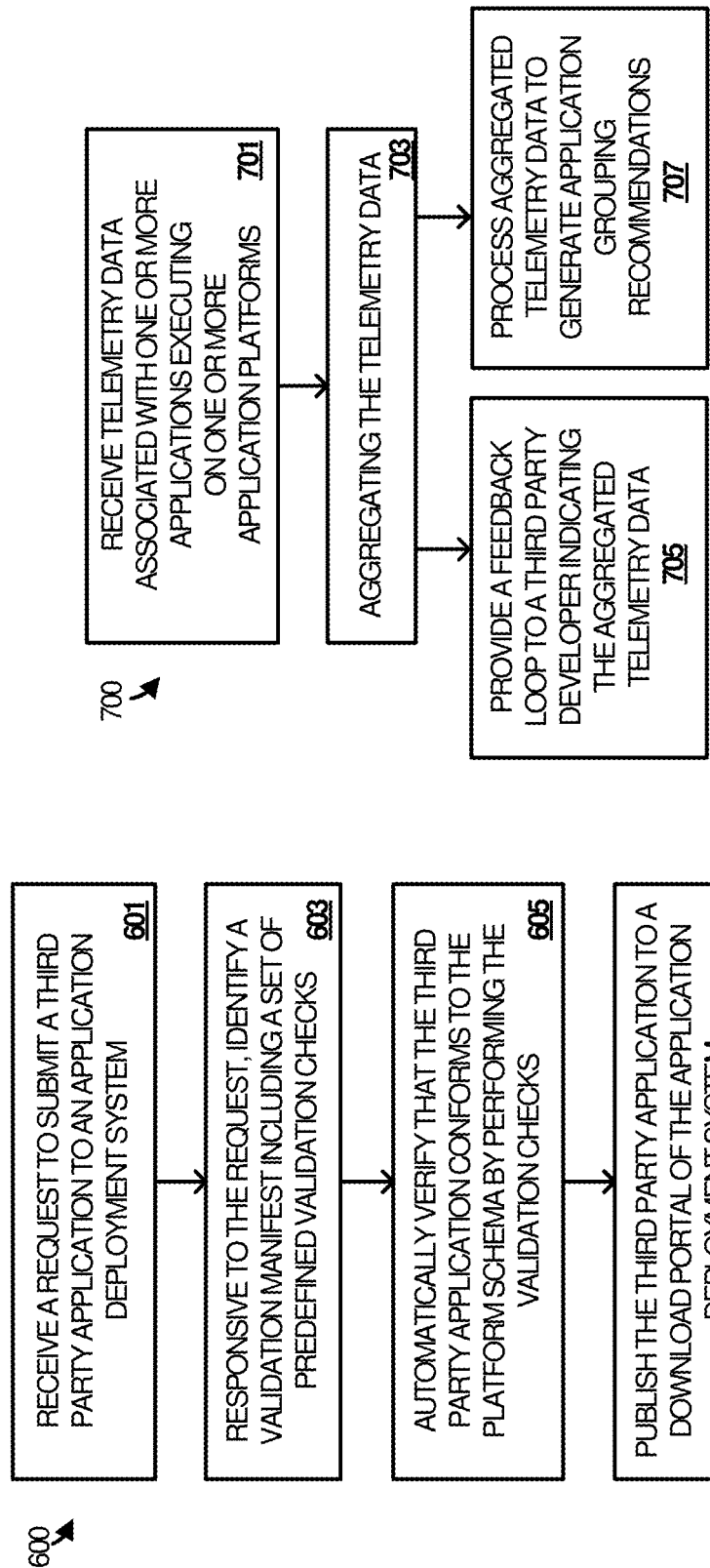

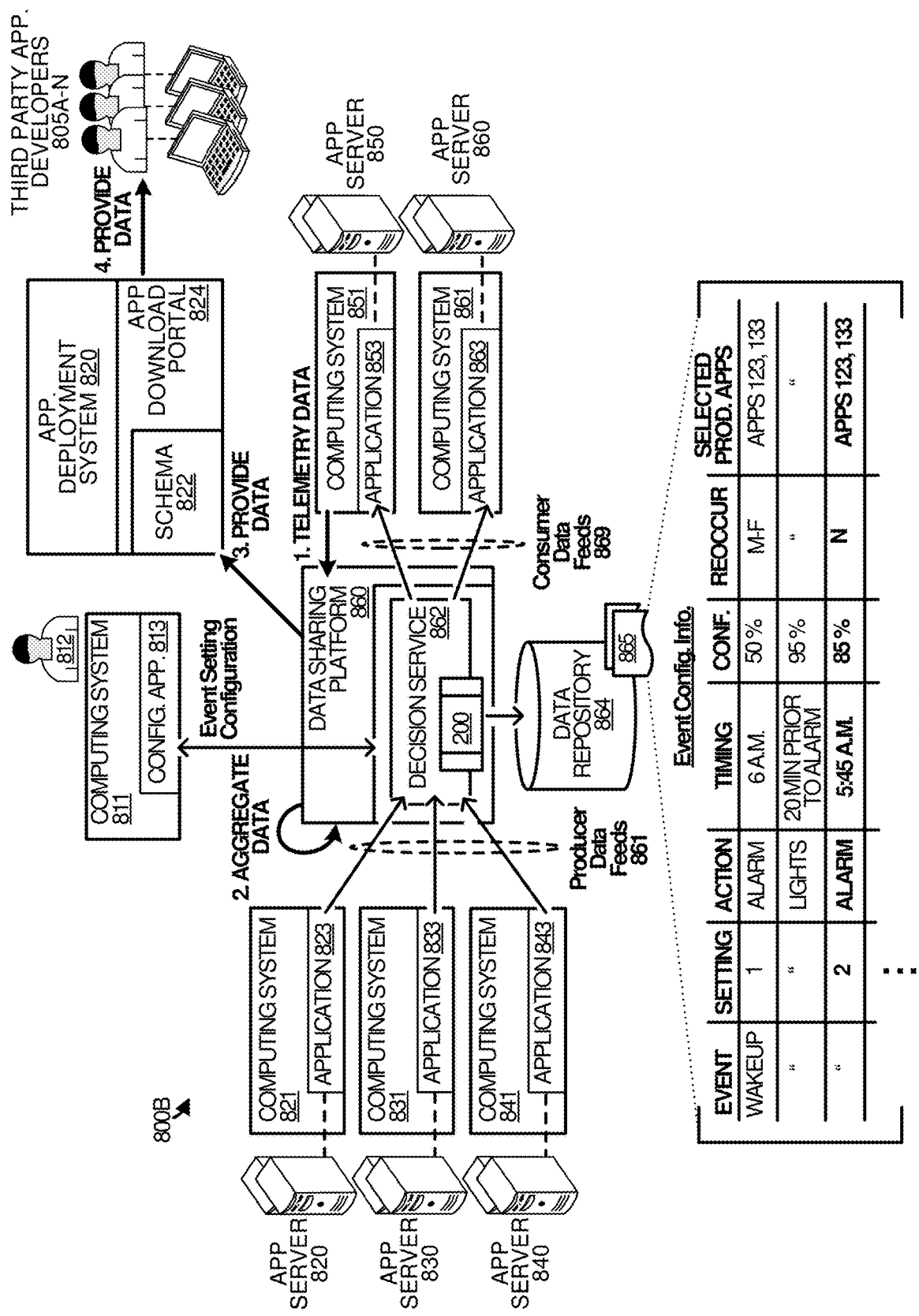

DEPLOYMENT OF APPLICATIONS CONFORMING TO APPLICATION DATA SHARING AND DECISION SERVICE PLATFORM SCHEMA

CROSS-REFERENCE CONTINUATION OF AND RELATED TO APPLICATIONS

This application is a continuation of U.S. patent application Ser. No. 15/268,930, entitled "DEPLOYMENT OF APPLICATIONS CONFORMING TO APPLICATION DATA SHARING AND DECISION SERVICE PLATFORM SCHEMA," filed on Sep. 19, 2016. This application is related to co-pending U.S. patent application Ser. No. 15/693,768, entitled "APPLICATION DATA SHARING AND DECISION SERVICE PLATFORM," filed on Sep. 1, 2017, and U.S. patent application Ser. No. 15/268,950, entitled "SYSTEMS AND METHODS FOR SHARING APPLICATION DATA BETWEEN ISOLATED APPLICATIONS EXECUTING ON ONE OR MORE APPLICATION PLATFORMS," filed on Sep. 19, 2016, the contents of which are expressly incorporated by reference herein.

BACKGROUND

The Internet of Things (IoT) generally refers to the use of sensors, actuators, and communication technology embedded into physical objects such that the objects are enabled to be tracked or controlled over networks, e.g., the Internet. In almost all realms of our daily lives, devices are becoming increasingly internet-connected. From light switches to music players, from weather sensors to cattle monitors, a wealth of data is available when IoT devices provide rich information or when IoT device are controlled via the Internet.

In parallel, the application (or "app") store phenomena has led independent software vendors (ISVs) to create applications that can process various types data and user input ranging from traffic congestion apps, gate opening apps, messaging apps, music streaming and play list apps, and the like.

Unfortunately, these applications are generally disconnected or isolated from one another—even when operating on the same application platform or device. For example, a smartphone device may contain various downloaded apps that rarely, if ever, have the capability to talk to one another. A few vendors have developed applications designed to support non-user initiated interactions with other applications. However, these applications are limited in what triggers the interactions and what actions the applications are able to take in response to the triggers.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to deployment of a decision service for sharing application data among multiple isolated applications executing on one or more application platforms. In an implementation, a method of deploying a platform schema for facilitating sharing of the application data among isolated applications executing on one or more application platforms is described. The method includes receiving a request to submit a third party application to an application deployment system, identifying a validation manifest associated with a platform schema responsive to receiving the request, and automatically verifying that the third party application to conforms to the platform schema by performing a set of pre-defined validation checks. The request identifies the platform schema and platform capability information associated with the third party application. The validation manifest includes the set of pre-defined validation checks.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 2 illustrates an example table showing application identifiers and associated application capabilities.

FIG. 3 illustrates an example table showing platform identifier associated with various registered applications.

FIG. 4 illustrates an example sequence diagram.

FIG. 5 illustrates an example sequence diagram.

FIG. 6 depicts a flow diagram illustrating example operations 600 of an application deployment system for deploying a platform schema for facilitating sharing of application data among isolated applications executing on one or more application platforms (or computing systems), according to some embodiments.

FIG. 7 depicts a flow diagram illustrating example operations 700 of an application deployment system for providing telemetry services, according to some embodiments.

FIGS. 8A and 8B depicts a block diagrams illustrating example operational architectures for sharing application data among multiple isolated applications executing on one or more application platforms (or computing systems) and aggregating telemetry data, according to some embodiments.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

The techniques described herein relate to deployment of a platform schema for facilitating sharing of application data among multiple isolated applications executing on one or more application platforms. A service provider registers a platform schema with a deployment system. Among other capabilities, the deployment system is configured to automatically validate, publish and distribute the third party application when it conforms to platform schema protocols.

The validation can include identifying a validation manifest associated with the platform schema that includes a set of predefined validation checks. In some embodiments, the predefined validation checks ensure that the platform capabilities, e.g., one or more registered inputs or outputs, conform to an expected Extensible Markup Language (XML) scheme. By way of example, the deployment system can be a public app store or an organizational or enterprise-based deployment system. Once verified, the application deployment system publishes the verified application making the application available for download, installation, and registration via an application platform. Once registered with the data sharing platform, the applications can share application data with other of multiple applications registered with the data sharing platform.

In some embodiments, the application deployment system, or a data sharing platform associated with the platform schema, aggregate telemetry data associated with one or more third party applications, and provide the aggregated information via a feedback channel to corresponding third party developers. Additionally, in some embodiments, the application deployment system, or a data sharing platform associated with the platform schema, can process the telemetry data to generate recommendations such as, for example, recommendations regarding groups of applications belonging to the same platform schemas or synergetic apps that are regularly used in conjunction with one another.

At least one technical effect discussed herein is the ability to automatically validate third party applications against a platform schema to facilitate sharing of application data among multiple otherwise isolated applications executing on one or more application platforms.

Figure 1:
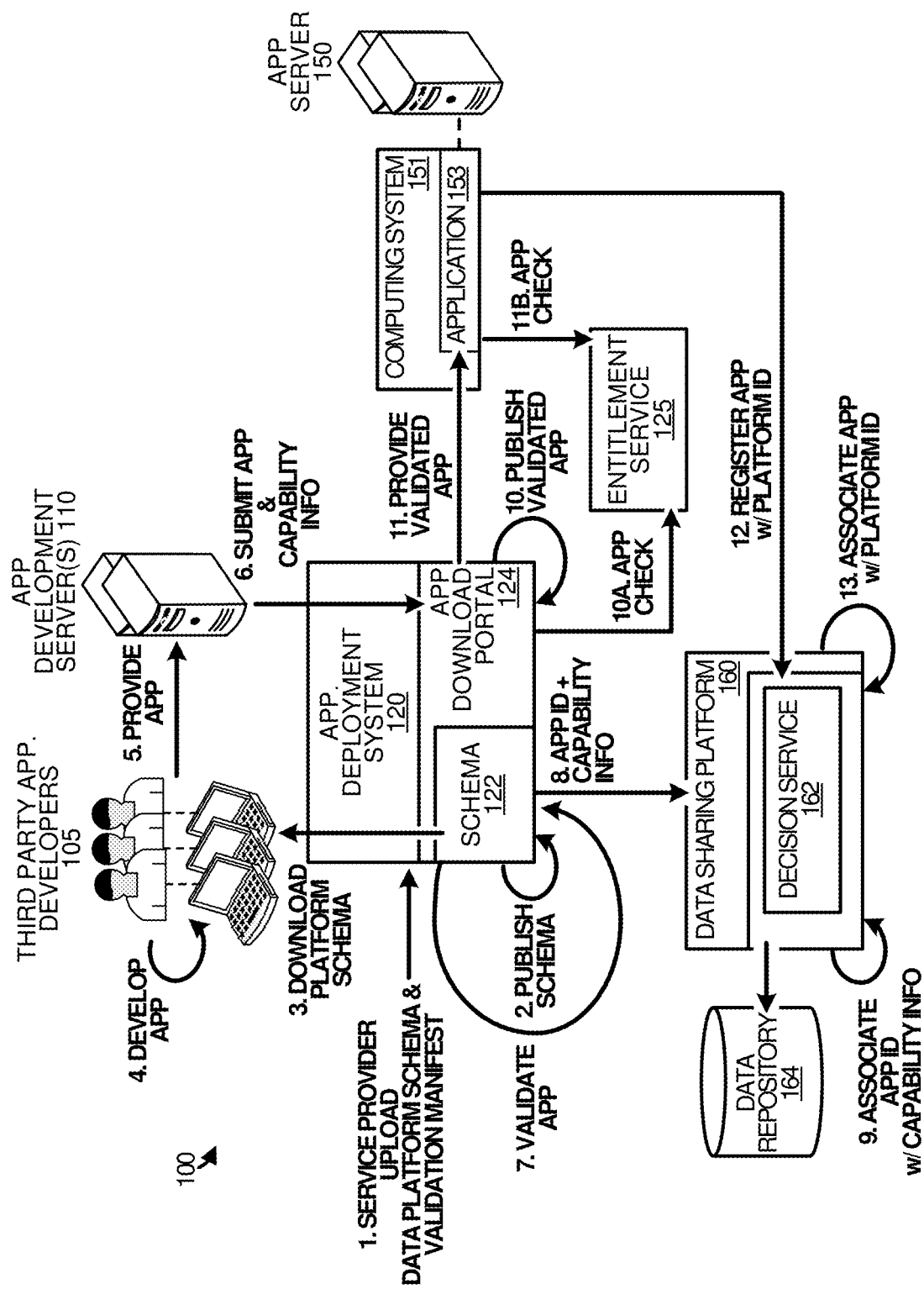
FIG. 1 depicts a block diagram illustrating an example operational architecture 100 for deploying a platform schema for facilitating sharing of application data among isolated applications executing on one or more application platforms (or computing systems), according to some embodiments.

FIG. 1 depicts a block diagram illustrating an example operational architecture 100 for deploying a platform schema for facilitating sharing of application data among isolated applications executing on one or more application platforms (or computing systems), according to some embodiments. The example operational architecture 100 includes an application ("app") deployment system 120, an entitlement service 125, third party app developers 105, app development servers 110, a computing system 151 executing (verified) application 153, a data sharing platform 160, an app server, and a data repository 164. A single computing system 151 executing a single application 153 is shown for convenience. However, it may be appreciated that the operational architecture can include any number of computing systems each executing any number of (verified) applications. The entitlement service 125 enables licensing verification capabilities for apps (e.g., independent software vendors or first party vendors) to authenticate and versionize applications. For example, the entitlement service may add monetization capabilities to app(s) via a manifest.

As shown in the example of FIG. 1, the application deployment system 120 includes an app download portal 124 and a data platform schema 122 that is provided by a service provider. The app download portal 124 can be, for example, a storefront service where verified (or approved) applications are hosted. In some embodiments, the hosted applications may be queried or searched using search/browse web services.

The data platform schema 122 may include standard development kit (SDK). The SDK may provide one or more interfaces that allow application developers 105 to generate and embed, or otherwise develop, applications that conform to the platform schema for facilitating sharing of application data among other applications. The data platform schema 122 can also identify an application program interface (API) representative of an interface through which third party applications executing on one or more application platforms (or computing systems) may communicate with the data sharing platform 160—or directly with each other in some instances. Among other implementations, the API may be an add-in application that runs in the context of a producer application or consumer application, an integrated component of the application, or a component of an operating system or some other application on a computing system.

In some embodiments, there may be multiple versions (e.g., v2.0, v2.1, etc.) of a data sharing platform, e.g., data sharing platform 160. A schema defines the capabilities that are available in each version of the data sharing platform and applications can self-declare, e.g., via a manifest, which capabilities are utilized during operation. If, for example, the application intends to use capabilities that are not available on a particular version of the data sharing platform then the application may be blocked from installation on that version of the platform. In this manner, incompatible applications may be blocked from installing on a particular platform or version of a platform.

The data sharing platform 160 is representative of a service or collection or services that facilitate sharing of application data feeds among otherwise isolated applications that are registered. Among other functions, the data sharing platform 160 includes a decision service 162 comprising a predictive analysis engine (not shown) capable of facilitating sharing of application data among isolated applications. For example, as shown in more detail in the examples of FIGS. 8A and 8B, the data sharing platform 160 processes producer application data feeds, blends the producer application feeds, and automatically configures or reconfigures event configuration information for the consumer applications.

The application deployment system 120 may include server computers, blade servers, rack servers, and any other type of computing system (or collection thereof) suitable for deploying a platform schema for facilitating sharing of application data among isolated applications executing on one or more application platforms (or computing systems) as described herein. Such systems may employ one or more virtual machines, containers, or any other type of virtual computing resource in the context of supporting enhanced group collaboration of which computing system 901 is representative.

The data sharing platform 160 may include server computers, blade servers, rack servers, and any other type of computing system (or collection thereof) suitable for carrying out or facilitating sharing of application data feeds among otherwise isolated applications as described herein. Such systems may employ one or more virtual machines, containers, or any other type of virtual computing resource in the context of supporting enhanced group collaboration of which computing system 901 is representative.

Computing system 151 is representative of any computing device suitable for employing application 153. Examples include desktop and laptop computers, tablets, smart phones, smart televisions, wearable devices (watches, glasses, etc.), and any other type of IoT device, of which computing system 901 is also representative.

In operation, a service provider first uploads (step 1) a data platform schema and validation manifest to the application deployment system 120. The validation manifest may include a set of predefined validation checks. For example, the set of predefined validation checks are used by the application deployment system 120 to confirm the one or more registered inputs or outputs conform to an expected Extensible Markup Language (XML) scheme.

As discussed herein, the application deployment system 120 can be a public app store, a private app store, or an organizational or enterprise-based app store including combinations or variations thereof. The application deployment system 120 receives and publishes the platform schema 122 (step 2). For example, the platform schema 122 can be published to a public or developer portal of the app deployment system 120. In some embodiments, once the platform schema 122 is published, it can be searched or browsed by third party application developers 105.

Next, the third party application developers 105 download or otherwise obtain the schema (step 3) from the application deployment system 120. The third party application developers 105 develop a third party application (step 4) including the platform schema 122. As discussed herein, the platform schema 122 can include an SDK that provides one or more interfaces allowing the third party application developers 105 to generate and embed, or otherwise develop, applications that conform to the platform schema for facilitating sharing of application data among isolated applications executing on one or more application platforms. In some embodiments, the third party developers 105 develop the third party application on, or provide the application to, one or more app development servers 110 (step 5).

Once the third party application is developed, the third party developers 105 submit the application for publication to the app deployment system 120 (step 6). As discussed herein, the request to submit the third party app can include a schema identifier that uniquely identifies the platform schema to which the application conforms. Additionally, the request can identify platform capability information associated with the third party application.

Once the third party application is submitted, the application deployment system 120 may automatically validate the application (step 7). The validation process can include identifying a validation manifest associated with the platform schema based on the schema identifier. The validation manifest can include a set of predefined validation checks. As discussed herein, the predefined validation checks may be used by the application deployment system 120 to confirm the one or more registered inputs or outputs conform to an expected scheme, e.g., an Extensible Markup Language (XML) scheme.

Once the third party application is verified to conform to the platform schema, the application deployment system 120 generates a unique application identifier associated with the third party application and provides the application identifier and the application capability information associated with the third party application to the application data sharing and decision service 160 (step 8). Alternatively, the application identifier can be submitted to the Store and the application deployment system 120 responsively ensures that the submitted identifier is unique. In some embodiments, the application identifier can be a Globally Unique Identifier (GUID) embedded within the memory of the application. In yet other embodiments, the application data sharing and decision service 160 generates the application identifier. The application data sharing and decision service 160 then associates the application identifier with the application capability information (step 9).

FIG. 2 illustrates an example table showing application identifiers and associated application capabilities. The application capabilities can include input data feeds and output data feeds. As shown in the example of FIG. 2, each application (as indicated by application identifier) is associated with one or more types of input data feeds and/or output data feeds. The types of data feeds can be types of data, data formats, etc., including combinations or variations thereof.

Referring again to FIG. 1, the application deployment system 120 publishes the validated application, e.g., on a public download portal 124 once the third party application is verified to conform to the platform schema (step 10). Responsive to receiving a request to download the validated third party application from computing system 151, the validated third party application 153 is provided to the computing system 151 (step 11). Prior to providing the validated app, the application deployment system 120 may perform an app check (step 10A) with an entitlement service 125. The entitlement service 125 may be, for example, a licensing store that maintains information about which applications (or versions of applications, features, etc.) have been purchased, etc. In some embodiments, a user is allowed to download the application 153 only once the application has been purchased. Alternatively or additionally, the application may be provided or downloaded by the computing system 151 but a runtime check (step 11B) performed to determine whether a license has been purchased and, for which version or included which functionality. For example, the runtime check can verify a level of functionality that should be provided, e.g., premium, standard paid, trial, expired trial, unlicensed, etc.

Once installed, application 153 executes on computing system 151 and registers with the data sharing platform 160 (step 12). Among other information, the registration can include the application identifier and a unique platform identifier. The unique platform identifier can uniquely identify a user or account with the data sharing platform. For example, in some embodiments, the unique platform identifier can be log in credentials or other credentials used by the computing system 151 to access the data sharing platform 160.

The data sharing platform 160 receives the registration request and associates the application with the platform identifier. As discussed herein, data or associations, etc., can be stored by the data sharing platform 160 in data repository 164. Application 153 can be a producer application representative of any application designed to provide data to other applications or a consumer application representative of any application designed to receive data from other applications or both a producer and consumer application. For example, a producer application can provide application data feeds to the data sharing platform 160 for processing and/or sharing with consumer applications. Application 153 may be a natively installed and executed application, a browser-based application, a mobile application, a streaming or streamed application, or any other type or application, variation, or combination thereof. Application 153 can also be part of an application suite consisting of multiple applications that are bundled together.

In some embodiments, the applications (application server clients) can include GUIs (graphical user interface) running on a PC, mobile phone device, a Web server, or even other application servers. The information traveling back and forth between an application server 150 and its app server client is not restricted to simple a particular display markup. Instead, the information is program logic that can take the form of data and method calls, the application server client can employ the exposed business logic in any manner that is suitable.

Once producer and consumer applications have registered with the data sharing platform 160, application data can be shared among the multiple isolated applications executing on one or more application platforms (or computing systems). Examples are shown and discussed in greater detail with reference to FIGS. 8A-8B.

FIG. 3 illustrates an example table showing platform identifier associated with various registered applications. As discussed herein, the unique platform identifier identifies a user or account with the data sharing platform 160. As shown in the example of FIG. 3, platform ID "ABCD" is associated with registered applications "1234," "5678" and "9101."

To further illustrate the operation of example operational architecture 100, FIGS. 4 and 5 are provided. FIGS. 4 and 5 illustrate sequence diagrams 400 and 500, respectively. The example sequence diagrams 400 and 500 depict example operations of the application development server 110 and the application deployment system 120 of FIG. 1 for automatically validating a third party application against a platform schema protocol, according to some embodiments.

Referring first to the example of FIG. 4, initially, the application development server sends a request to submit an application to the application deployment system 120. The request may be initiated by one or more application developers (not shown) and include application capability information. As discussed herein, the application capability information may include input capabilities and/or output capabilities indicating the types of application data feeds that the application can use (or receive) and the types of application data feeds that the application can produce (or provide), respectively.

Responsive to receiving the request, the application deployment system 120 identifies a validation manifest associated with the platform schema. As discussed herein, the validation manifest includes a set of pre-defined validation checks. In some embodiments, the validation manifest can be identified based on a schema identifier included with the request to submit the third party application. The schema identifier uniquely identifies the platform schema to which the application conforms.

The application deployment system 120 then sends a validation trigger notifying the application development server 110 that the validation process is to commence. In response to the validation trigger, the application development server installs a temporary instance of the third party application under validation. The predefined validation checks are then commenced. In some embodiments, each validation check involves generating or receiving data and determining whether the data conforms to expected data. If so, the validation check passes. If not, the validation check fails. Validation data is generated and provided to the application deployment system 120. The application deployment system 120 may determine if each validation check passes or fails. For example, the application deployment system 120 may verify that the input data feeds and output data feeds (or actions) conform to the expected XML representations as determined by the platform schema. In some embodiments, the validation checks can include generating particular API calls or the like. The validation manifest may include any number of validation checks.

Once the checks are complete, the application deployment system 120 makes a validation determination. For example, in some embodiments, the validation may pass if each validation check passes. Lastly, the application deployment system 120 notifies the application development server 110 that the third party application passed or failed. If the validation passes, the deployment process continues as discussed with reference to FIG. 1. However, if the validation fails, the third party developers can be notified and the application can be modified accordingly.

Example sequence diagram 500 is similar to example sequence diagram 400 with the exception that in sequence diagram 500, the application deployment system 120 performs the bulk of the verification tasks including instantiating the temporary instance of the application and generating the data for each validation check. Other possible combinations or variations of performance of the verifications tasks are also possible.

FIG. 6 depicts a flow diagram illustrating example operations 600 of an application deployment system for deploying a platform schema for facilitating sharing of application data among isolated applications executing on one or more application platforms (or computing systems), according to some embodiments. The example operations 600 may be performed in various embodiments by application deployment system 120 of FIG. 1, or one or more processors, modules, engines, components or tools of the application deployment system 120 of FIG. 1.

To begin, at 601, the application deployment system receives a request to submit a third party application to an application deployment system. As discussed herein, the request may identify a platform schema and platform capability information associated with the third party application. Additionally, the request may include a validation manifest. The platform capability information may include one or more registered input data feeds or output data feeds.

At 603, the application deployment system identifies a validation manifest associated with the platform schema responsive to receiving the request. The validation manifest may include a set of predefined validation checks which, if successfully performed, validate the third party application. In some embodiments, the validation manifest is identified based on a schema identifier included with the request to submit the third party application.

At 605, the application deployment system automatically verifies that the third party application conforms to the platform schema by performing the set of validation checks. As discussed herein, the set of predefined validation checks can confirm that the one or more registered input data feeds or output data feeds conform to an expected Extensible Markup Language (XML) scheme. Lastly, at 607, once the third party application is verified to conform to the platform schema, the application deployment system publishes the third party application to a download portal of the application deployment system FIG. 7 depicts a flow diagram illustrating example operations 700 of an application deployment system for providing telemetry services, according to some embodiments. The example operations 700 may be performed in various embodiments by application deployment system 120 of FIG. 1, or one or more processors, modules, engines, components or tools of the application deployment system 120 of FIG. 1. Alternatively or additionally, some or all of the operations can be performed in whole or in part by a data sharing platform such as, for example, data sharing platform 160 of FIG. 1.

To begin, at 701, the application deployment system receives telemetry data associated with one or more applications executing on one or more application platforms. At 703, the application deployment system aggregates the telemetry data. At 705, the application deployment system provides a feedback loop to a third party application developer indicating the aggregated telemetry data. For example, data from an application may be gathered and aggregated in order to be provided back to third party developers for improving and/or otherwise optimizing the application. Likewise, at 707, the application deployment system can process the aggregated telemetry data to generation application grouping recommendations. For example, if the system determines that certain applications are commonly used together, then a recommendation may be generated to use one or more applications related to applications downloaded and/or otherwise registered with a particular platform identifier.

Figure 8A:
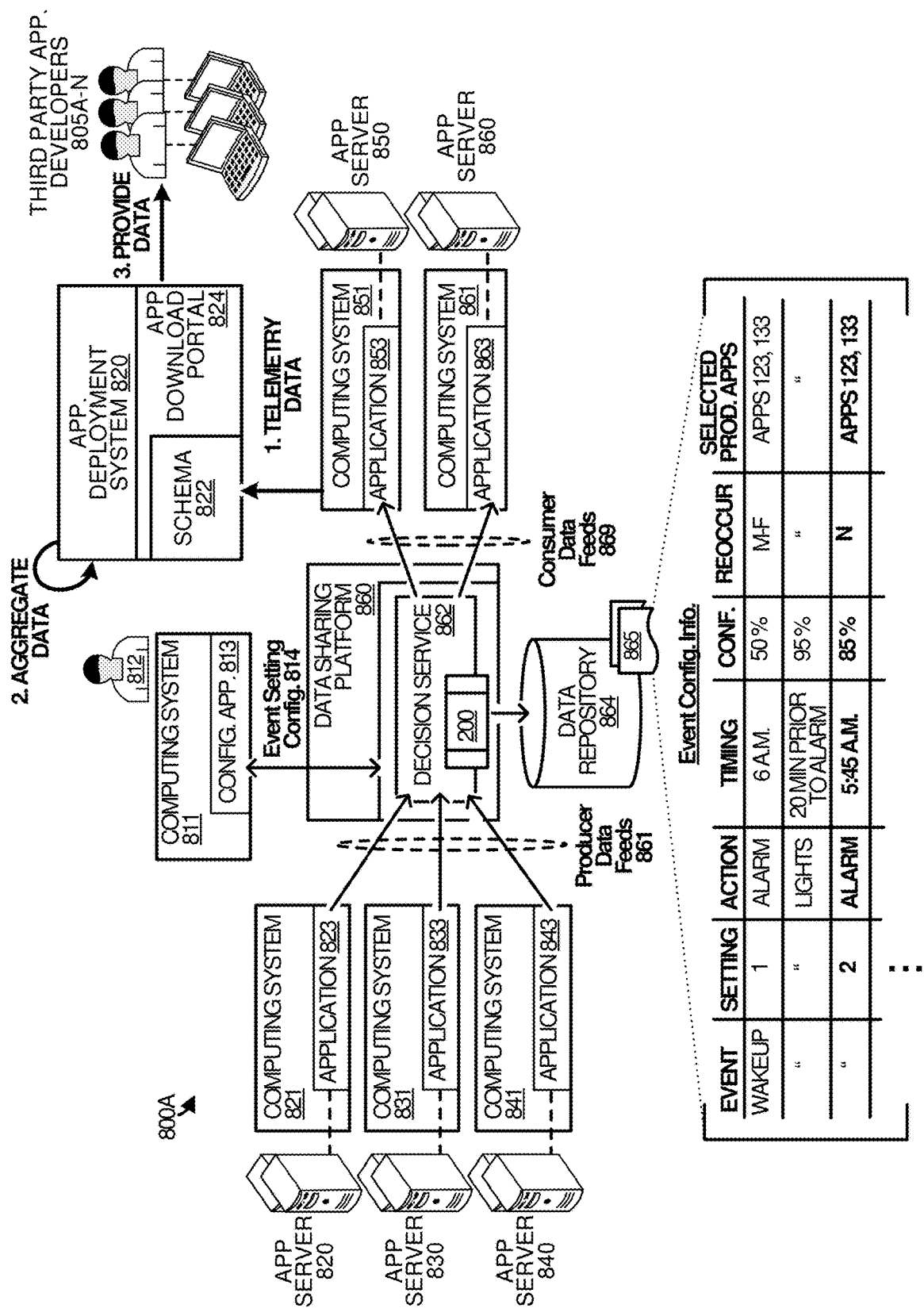

FIGS. 8A and 8B depicts a block diagrams illustrating example operational architectures 800A and 800B for sharing application data among multiple isolated applications executing on one or more application platforms (or computing systems) and aggregating telemetry data, according to some embodiments. The example operational architecture 800A-800C include a single isolated application (e.g., producer, consumer, or configuration application) executing on each computing system. However, it may be appreciated that any number of isolated applications can execute on each computing system.

The example operational architecture 800A-800C include computing systems 811, 821, 831, 841, 851 and 861, a data sharing platform 860, and application ("app") servers 820, 830, 840, 850 and 860. The data sharing platform 860 includes a data repository 864. As shown in the example of FIG. 1, computing systems 821, 831 and 841 include producer applications 823, 833 and 843, respectively. Computing systems 851 and 861 include consumer applications 853 and 863, respectively. Although not shown, the producer applications 823, 833 and 843, and consumer applications 853 and 863 can each include an application program interface (API) representative of an interface through which the computing systems may communicate with the data sharing platform 860—or directly with each other in some instances. Among other implementations, the API may be an add-in application that runs in the context of a producer application or consumer application, an integrated component of the application, or a component of an operating system or some other application on a computing system.

The data sharing platform 860 may be data sharing platform 160 of FIG. 1, although alternative configurations are possible. The data sharing platform 860 is representative of a service or collection or services that facilitates sharing of application data feeds among otherwise isolated applications that are registered. Among other functions, the data sharing platform 860 includes a decision service 862 comprising a predictive analysis engine (not shown) capable of processing producer data feeds 861, blending the feeds, and automatically configuring or reconfiguring event configuration information for the consumer applications.

The data sharing platform 860 may include server computers, blade servers, rack servers, and any other type of computing system (or collection thereof) suitable for carrying out or facilitating sharing of application data feeds among otherwise isolated applications as described herein. Such systems may employ one or more virtual machines, containers, or any other type of virtual computing resource in the context of supporting enhanced group collaboration of which computing system 901 is representative.

Computing systems 811, 821, 831, 841, 851 or 861, are representative of any computing devices suitable for employing applications 813, 823, 833, 843, 853 and 863. Examples include desktop and laptop computers, tablets, smart phones, smart televisions, wearable devices (watches, glasses, etc.), and any other type of IoT device, of which computing system 901 is also representative.

Referring still to FIG. 8, configuration application 813 executes on computing system 811. As discussed herein, the configuration application 813 may be optional or may execute on another of computing system, 821, 831, 841, 851 or 861, in addition or in lieu of one or more other applications. The configuration application 813 can be representative of any application designed to configure event configuration information for one or more other consumer applications. The configuration application 813 may be a natively installed and executed application, a browser-based application, a mobile application, a streaming or streamed application, or any other type or application, variation, or combination thereof. The configuration application 813 can also be part of an application suite consisting of multiple applications that are bundled together.

The applications 813, 823, 833, 843, 853 and 863 execute on computing system, 821, 831, 841, 851 or 861. As shown in the example of FIG. 1, the producer applications 823, 833 and 843 can be representative of any applications designed to share data with other applications. For example, the producer applications 823, 833 and 843 can provide application data feeds to the data sharing platform 860. Likewise, the consumer applications 853 and 863 can be representative of any applications designed to utilize shared data generated by other, otherwise isolated, applications. The applications 813, 823, 833, 843, 853 and 863 may be a natively installed and executed application, a browser-based application, a mobile application, a streaming or streamed application, or any other type or application, variation, or combination thereof. The applications 813, 823, 833, 843, 853 and 863 can also be part of an application suite consisting of multiple applications that are bundled together.

The app servers 820, 830, 840, 850 and 860 may expose logic through a component API, such as, for example, the Enterprise JavaBean (EJB) component model found on Java 2 Platform, Enterprise Edition (J2EE) application servers. Additionally, the application servers 820, 830, 840, 850 and 860 may manage the own resources. The gate-keeping duties can include, but are not limited to, security, transaction processing, resource pooling, and messaging. The app servers may also employ various scalability and fault-tolerance techniques.

The applications (application server clients) can include GUIs (graphical user interface) running on a PC, mobile phone device, a Web server, or even other application servers. The information traveling back and forth between an application server and its app server client is not restricted to simple a particular display markup. Instead, the information is program logic that can take the form of data and method calls, the application server client can employ the exposed business logic in any manner that is suitable.

Prior to operation, applications 823, 833, 843, 853 and 863 register with the data sharing platform 850. For example, the applications 823, 833, 843, 853 and 863 can register by providing registration identification information to the data sharing platform 860. The registration identification information can include, for example, a user identifier or some other identification information that may be used by the data sharing platform 860 to correlate and subsequently identify related applications that are registered with the data sharing platform 860. The registration identification information may be stored in data repository 864.

The registration identification information can also include application identification information that may be used by the data sharing platform 860 to identify input or output capabilities of the application. The input capabilities can indicate the types of data feeds that the application can use while the output capabilities indicate the types of data feeds that the application can produce. Although not shown in the example of FIG. 8, in some embodiments, an application can be both a producer application and a consumer application.

Assuming the producer applications 823, 833, and 843 and the consumer applications 853 and 863 have previously registered with the data sharing platform 860, the configuration application 813 is used to set event configuration information for one or more other consumer applications. The configuration can include setting information for an event. The event configuration information may include an event setting identifies one or more actions to be executed by one or more consumer applications and timing information indicating when the one or more actions are to be executed. As discussed herein, in some embodiments the configuration application 813 may be optional. In such instances, event settings may be configured by, for example, consumer applications 853 and 863 or producer applications 823, 833, and 843.

The data sharing platform 860 may store the event configuration information in data repository 864. As illustrated in the example of FIG. 8, a manifest 865 is generated for each event configuration information entry (or instance). By way of example, FIG. 8 illustrates a "wakeup" event including event settings that identifies one or more actions to be executed by a light control consumer application 853 and an alarm application 863 and timing information indicating when the lights are to be turned on and the alarm is supposed to execute. A confidence level (or percentage) associated with each setting (or action) is determined by the decision service 862. As discussed herein, the confidence level may be used to identity the correct setting when multiple actions are set to trigger (or execute) within the same time window or frame.

Additionally, related producer applications can be identified and selected. For example, the data sharing platform can utilize a registration identifier included with a configuration request to identify other applications that are registered with the data sharing platform with the same registration identifier (e.g., same user). The other application may be executing on one or more different application platforms (including on the same application platform as a consumer application). As discussed herein, the identified applications may then be filtered such that only compatible applications are provided for selection (e.g., by a user of the registration application 813).

The compatible applications may be identified for each consumer application based on producer applications whose output capabilities match the input capabilities of the particular consumer application. As discussed herein, during the validation stage, application developers must provide the input capabilities of the application which can indicate the types of data feeds that the application can use and the output capabilities which can indicate the types of data feeds that the application can produce. Although not shown in the example of FIG. 8, in some embodiments, an application can be both a producer application and a consumer application.

As shown in the example of FIG. 8, multiple actions are configured for a "wakeup" event. Specifically, an initial or first setting of the event configuration information an alarm action is set to be triggered via an alarm application, e.g., application 863, and a lights action is set to be trigger via a smart light switch operator application, e.g., application 853. Additionally, producer applications 823 and 833 are selected as being producer applications associated with the alarm and lights actions.

As discussed herein, the decision service 862 includes a predictive analysis engine (not shown) capable of processing the producer data feeds 861, blending the feeds, and automatically configuring or reconfiguring event configuration information for the consumer applications 853 and 863. The decision service 862 generates consumer data feeds 869 which may be raw or filtered producer data feeds 861, one or more instructions or API calls to the consumer applications 853 and 863, or some combination or variation thereof. Likewise, producer data feeds 861 can be raw data feeds that are processed by the decision service 862, API calls to configure (or reconfigure) the event configuration information or some combination or variation thereof.

Referring again to FIGS. 8A and 8B, in operation, telemetry data is aggregated at the data sharing platform 860 (FIG. 8B) or the application deployment system 820. As shown, the aggregated data can be provided as feedback to the third party application developers.

Figure 9:
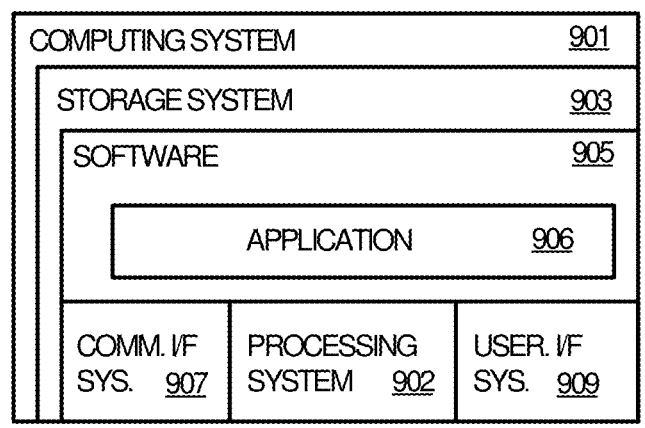
FIG. 9 is a block diagram illustrating a computing system suitable for implementing the scope-based certificate deployment technology disclosed herein, including any of the applications, architectures, elements, processes, and operational scenarios and sequences illustrated in the Figures and discussed below in the Technical Disclosure.

FIG. 9 illustrates computing system 901, which is representative of any system or collection of systems in which the various applications, services, scenarios, and processes disclosed herein may be implemented. For example, computing system 901 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and an optional user interface system 909.

Processing system 902 loads and executes software 905 from storage system 903. When executed by processing system 902 for deployment of scope-based certificates in multi-tenant cloud-based content and collaboration environments, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for directing the system to perform the processes described with reference to FIGS. 3-6.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system. Indeed, encoding software on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here. In some cases, the user interface system 909 may be omitted when the computing system 901 is implemented as one or more server computers such as, for example, blade servers, rack servers, or any other type of computing server system (or collection thereof).

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An application deployment system configured to facilitate sharing of application data among isolated applications, the system comprising:
   one or more processors; and
   one or more computer readable storage media having program instructions stored thereon which, when executed by the one or more processors, direct the one or more processors to:
   receive a request to submit a third-party application to the application deployment system, wherein the request identifies a platform schema and capability information associated with the third-party application, and wherein the capability information indicates input and output capabilities of the third-party application;
   identify a validation manifest associated with the platform schema;
   perform a set of validation checks indicated by the validation manifest to verify that the input and output capabilities of the third-party application conform to the platform schema;
   responsive to verifying that the third-party application conforms to the platform schema, publish the third-party application to a download portal for computing systems to download and install the third-party application;
   receive telemetry data generated by the third-party application on the computing systems;
   generate an application grouping recommendation based on the telemetry data; and
   provide the application groupings recommendation to a developer of the third-party application.

2. The application deployment system of claim 1, wherein the capability information associated with the third-party application includes one or more input data feeds and one or more output data feeds.

3. The application deployment system of claim 2, wherein the set of validation checks are configured to confirm that the one or more input data feeds and the one or more output data feeds conform to the platform schema.

4. The application deployment system of claim 1, wherein the program instructions, when executed by the one or more processors, further direct the one or more processors to:
   identify a unique application identifier associated with the third-party application; and
   provide the application identifier and the capability information associated with the conforming third-party application to a decision service.

5. The application deployment system of claim 1, wherein the validation manifest is identified based on a schema identifier included with the request to submit the third-party application to the application deployment system.

6. The application deployment system of claim 1, wherein the program instructions, when executed by the one or more processors, further direct the one or more processors to:
   responsive to receiving the platform schema from a service provider, publish the platform schema to the download portal of the application deployment system.

7. The application deployment system of claim 1, wherein the program instructions, when executed by the one or more processors, further direct the one or more processors to:
   provide the platform schema to the third-party application developer.

8. The application deployment system of claim 7, wherein the program instructions, when executed by the one or more processors, further direct the one or more processors to:
   identify the telemetry data associated with the third-party application; and
   provide a feedback loop to the third-party application developer indicating the telemetry data.

9. The application deployment system of claim 1, wherein the program instructions, when executed by the one or more processors, further direct the one or more processors to:
   provide, via the download portal, the third-party application to a computing system responsive to receiving a request to download the third-party application;
   wherein the third-party application comprises an isolated application; and
   wherein installed instances of the third-party application share the input data and output data with other instances of other isolated applications through a data sharing platform.

10. The application deployment system of claim 9, wherein prior to providing the third-party application to the computing system, the program instructions, when executed by the one or more processors, further direct the one or more processors to:
    perform an application check with an entitlement service.

11. The application deployment system of claim 1, wherein the application deployment system comprises an application store.

12. A method of operating application deployment system to facilitate sharing of application data among isolated applications, the method comprising:
    processing a request to submit a third-party application to an application deployment system, wherein the request identifies a platform schema and capability information associated with the third-party application, and wherein the capability information indicates input and output capabilities of the third-party application;
    identifying a validation manifest associated with the platform schema;

performing a set of validation checks identified by the validation manifest to verify that the input and output capabilities of the third-party application conform to the platform schema;

responsive to verifying that the third-party application conforms to the platform schema, publishing the third-party application to a download portal for computing systems to download and install the third-party application;

receiving telemetry data generated by the third-party application on the computing systems;

generating an application grouping recommendation based on the telemetry data; and providing the application grouping recommendation to a developer of the third-party application.

13. The method of claim 12, further comprising:

receiving the platform schema from a service provider; and responsively publishing the platform schema to a schema download portal for deployment by the application deployment system.

14. The method of claim 13, further comprising:

responsive to a request for the platform schema, providing, via the schema download portal, the platform schema to the third-party application developer.

15. The method of claim 12, further comprising:

responsive to verifying that the third-party application conforms to the platform schema, publishing the third-party application to an application download portal for deployment by the application deployment system.

16. The method of claim 12, further comprising:

identifying a unique application identifier associated with the third-party application; and providing the application identifier and the capability information associated with the conforming third-party application to a decision service.

17. One or more non-transitory computer readable storage media having program instructions stored thereon that, when executed by one or more processors, direct a power control module to at least:

receive a request to submit a third-party application to the application deployment system, wherein the request identifies a platform schema and capability information associated with the third-party application, and wherein the capability information indicates input and output capabilities of the third-party application;

identify a validation manifest associated with the platform schema; perform a set of validation checks indicated by the validation manifest to verify that the input and output capabilities of the third-party application conform to the platform schema;

responsive to verifying that the third-party application conforms to the platform schema, publish the third-party application to a download portal for computing systems to download and install the third-party application;

receive telemetry data generated by the third-party application on the computing systems;

generate an application grouping recommendation based on the telemetry data; and provide the application grouping recommendation to a developer of the third-party application.

18. The one or more non-transitory computer readable storage media of claim 17, wherein the capability information associated with the third-party application includes one or more input data feeds or output data feeds, and wherein the set of validation checks are configured to confirm that the one or more input data feeds and one or more output data feeds conform to the platform schema.

19. The one or more non-transitory computer readable storage media of claim 17, the program instructions further comprising: provide, via the download portal, the third-party application to a computing system responsive to receiving a request to download the third-party application; wherein the third-party application comprises an isolated application; and wherein installed instances of the third-party application share the input data and output data with other instances of other isolated applications through the data sharing platform.

* * * * *